United States Patent [19]

Anderson et al.

[11] Patent Number: 5,327,489
[45] Date of Patent: Jul. 5, 1994

[54] METHOD AND APPARATUS FOR MONITORING A NETWORK FOR CUSTOMER SIGNALING DURING THE TERM OF A CALL

[75] Inventors: Thomas W. Anderson, Naperville; Elliott Baral, Chicago; Ronald S. Byrd, North Aurora; Bernard W. Fecht, Naperville, all of Ill.; David S. Isenberg, Shrewsbury, N.J.; Larry W. Kirsch, Bolingbrook, Ill.; Frederick W. Korty; Ronald B. Martin, both of Wheaton, Ill.; Dario L. Parola, Matawan, N.J.

[73] Assignee: AT&T Bell Laboratories, Murray Hill, N.J.

[21] Appl. No.: 808,348

[22] Filed: Dec. 16, 1991

[51] Int. Cl.[5] ............... H04M 3/42; H04M 1/64; H04M 15/00; H04M 9/08
[52] U.S. Cl. .................. 379/207; 379/67; 379/89; 379/94; 379/127; 379/222; 379/410
[58] Field of Search .................. 379/14, 34, 201, 207, 379/222, 351, 410, 345, 67, 88, 127, 142, 89, 94, 100

[56] References Cited

U.S. PATENT DOCUMENTS

| | | | |
|---|---|---|---|
| 4,860,347 | 8/1989 | Costello | 379/188 X |
| 4,918,725 | 4/1990 | Takahashi | 379/345 X |
| 4,932,042 | 6/1990 | Baral et al. | 379/67 |
| 5,033,079 | 7/1991 | Catron et al. | 379/211 X |

Primary Examiner—James L. Dwyer
Assistant Examiner—Harry S. Hong
Attorney, Agent, or Firm—Michael B. Johannesen

[57] ABSTRACT

A network monitor and associated control system is provided to monitor a toll network for customer signaling. A multi-tone signal processor and associated control is provided such that when signaling is detected, such signaling is validated against a provisioned list. A valid signal is reported to a central control of the network switch, which takes action in response to the signal.

25 Claims, 8 Drawing Sheets

FIG. 11
NETWORK MONITOR

METHOD AND APPARATUS FOR MONITORING A NETWORK FOR CUSTOMER SIGNALING DURING THE TERM OF A CALL

TECHNICAL FIELD

This invention relates to the field of telecommunications networks, and more specifically, to a method and apparatus for detecting customer signaling on the network during the term of a network call and providing access to network services responsive thereto.

BACKGROUND OF THE INVENTION

Telecommunications may be described as increasingly "feature rich." That is, there is an ever increasing array of features and services available to individual and business telephone subscribers. Many of the popular features, such as three-way calling, call forwarding and speed calling, are implemented at a local telephone switching system. Such features are generally initiated by the user signaling the local switch. For example, to set up a three-way call a user establishes a first call, flashes the switch-hook to signal the switch that three-way calling is desired, and then dials the telephone number of the third party. In response, the local switch sets up a three-way circuit.

In contrast to such locally provided features, network (also called toll or long distance) telecommunications supports a different type of features and/or services. Basic network telecommunications access is achieved through 1+ and 0+ calls; wherein 0+ calls provide a variety of credit card or operator assisted features. Other network telecommunications services (such as "800", "900" and software defined network) require that the user initiates these services by dialing a special 10 digit number. The toll switch recognizes the dialed number as a special number, performs a data base look-up (frequently based on both the dialed number and the calling line identification or "ANI"), and takes action according to the data retrieved from the data base.

At least one new feature has recently been proposed for network telecommunications that require the toll switch to recognize customer signaling: U.S. Pat. No. 4,932,042 entitled Spontaneous Voice and Data Messaging which issued Jun. 5, 1990, to Baral et al. This feature provides a calling party with the option of leaving a voice mail message after determining that the called party is busy or not answering. After a call is established, the calling party enters a series of dual-tone, multi-frequency (DTMF) signals and, in response, the toll switch routes the calling party to a voice messaging system. There is currently no implemented DTMF detector in toll switches capable of intercepting and translating these customer signals during the entire call for every call through the switch.

Another proposed network feature is sequence dialing, wherein a user may dial a second destination telephone number after a first connection is terminated without the user hanging up. This feature is useful for callers from pay telephones, credit card callers, or callers from other countries who have entered identification and billing information into the system, and need to make multiple calls. After the first called party disconnects, the caller enters one or more DTMF digits or other signals which cause the network switch to maintain the connection and then accept a new destination telephone number.

Therefore, a problem in the art is that there is no capability in network switches that can recognize customer signaling for the entire length of a network call, from pre-answer to post disconnect, for all calls in the network upon which a feature rich network may be built.

SUMMARY OF THE INVENTION

The aforementioned problem is solved and a technical advance is achieved in the art by providing an in-band signaling detector for monitoring calls that enter a telephone network for detecting customer signaling during the entire call, from preanswer through called and calling party disconnect, and providing a system for communicating detected in-band signaling to a processor in a toll switch for providing the desired features and services. Additionally, the signaling network is monitored for out-of-band signaling when common channel signaling is available. If a signaling sequence indicating a feature or service is detected via the signaling network, the toll switch provides the desired features and/or services.

In accordance with one embodiment of the invention, a network monitor monitoring the network for in-band signaling and comprising a multi-tone signal processor and an echo canceler is connected to a channel. A controller is connected to the multi-tone signal processor for activating and deactivating the multi-tone signal processor, collecting and verifying detected signals, and reporting valid in-band signaling to service logic in a toll switch. Optionally, the controller may provide an audible response to valid or invalid signaling, either by one or more tones or by a prerecorded announcement. The echo canceler is connected to the channel on the local exchange side of the multi-tone signal processor. Advantageously, each side of a call has an echo canceler so that echos of signals from the telephone stations on each end of the call are canceled, and the multi-tone signal processor may determine which telephone station initiated the signaling.

In accordance with an exemplary method of the invention, a telecommunications network is provided comprising one or more network switches, a plurality of channels interconnected under control of ones of the network switches, and one or more network monitors comprising multi-tone signal processor under control of the network switches and connected to the channels. A call origination is received on one of the channels, one of the network monitors connected to the channel of the call origination is enabled for at lest the interval to call answer or abandonment, and when signaling is received at the network monitor, the network monitor reports the signaling to a switch which provides access to the network service for that channel.

Optionally, either the calling or the called party may initiate features by signaling the network monitor. The network monitor may advantageously be active during the full duration of the call. Additionally, out-of-band signaling may be monitored for feature requests. The network monitors may be activated by a timer or by out-of-band signaling.

BRIEF DESCRIPTION OF THE DRAWING

A more complete understanding of the invention may be obtained from a consideration of the following description in conjunction with the drawings, in which.

DETAILED DESCRIPTION

Figure 1:
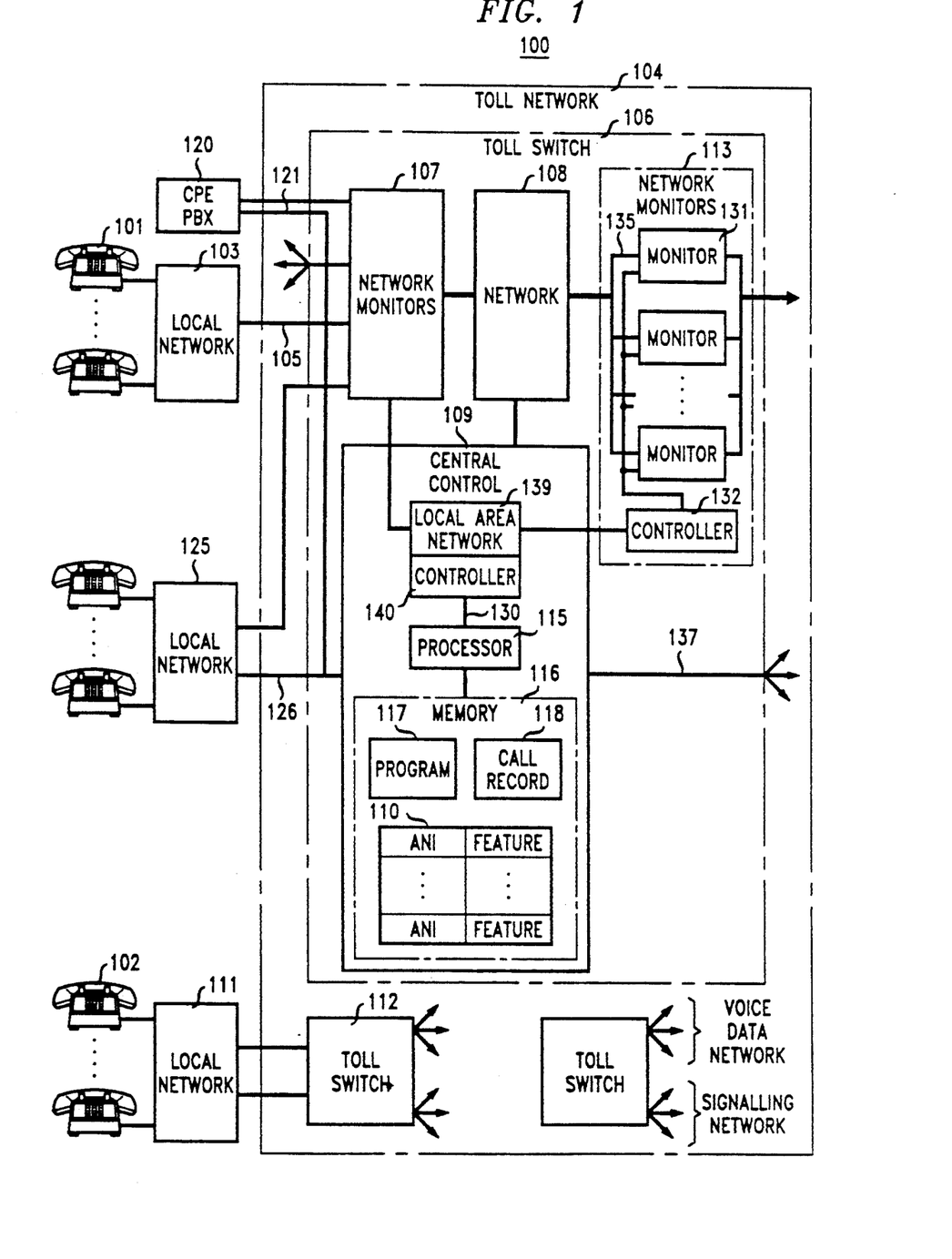
FIG. 1 is a block diagram of a telephone network showing a toll switch equipped with network monitors.

FIG. 1 is a block diagram of a telephone network 100, incorporating an exemplary embodiment of this invention. A customer at calling telephone 101 with a given directory number wishes to reach a called telephone 102 with a second directory number. The calling party dials the number of the called party, which is determined by a local switch in local network 103 as a long distance or network call. Local network 103 extends the call to toll network 104 by seizing an access trunk or channel 105, as is known in the art, to toll switch 106. The call is received at toll switch 106 by a switching network 108.

In a first exemplary embodiment of this invention, a network monitor 107 is connected to access trunk 105 between local network 103 and switching network 108. The calling customer's telephone number is forwarded from local network via Automatic Number Identification (ANI) signals, or common channel signaling (not shown). Central control unit 109 of toll switch 106 determines whether this access trunk needs to be monitored by looking up the received ANI in table 110 and determining if that ANI is associated with one or more features or services. Alternatively, all calls can be monitored for signaling and then the use of the feature or service may be validated when signaling is detected or when a signal is received on the signaling channel. This would be useful, for example, when a call is made from CPE 120, and CPE 120 permits the caller to use network features. If the calling or called customer is one that may use special features, network monitor 107 is enabled to monitor the call. Toll switch 106 sets up a connection over toll network 104 through network monitor 107 to local network 111 via toll switch 112. Called telephone 102 is then alerted by local network 111.

Monitoring access trunk 105 may not be desirable in all cases. Therefore, monitoring the network is performed in a further exemplary embodiment on the inter-toll side of switching network 108. In this embodiment, outgoing trunk 135 is selected and then network monitor 113 is activated on outgoing trunk 135.

The calling or called party may, at any time after the network monitor 107, 113, or 131 is activated, signal toll switch 106 to provide a feature or a service. For example, a proposed feature that may use this invention is Spontaneous Voice Messaging, as described in the above-cited Baral et al. patent. After the call is extended to telephone 102, and, for example, the called party does not answer, the calling party may enter a predetermined string, such as *vms (*867 or *Voice Message Service). Network monitor 107, 113, or 131 detects the signal string, translates the string into a token or code, and forwards the signal to the central control 109 of toll switch 106. Central control 109 may then disconnect the call from local network 111 and reconnect the call to a voice message service, as described more fully in Baral et al.

Additionally, the calling party may signal the toll switch 106 after the called party disconnects (hangs up). Again, this feature is useful for calling parties calling from pay phones who have already entered credit card information or for international callers who do not want to release the international trunk. The calling party enters a further predetermined string, network monitor 107, 113, or 131 detects the signal, translates the string into a token or code, and forwards the signal to central control 109 of toll switch 106. Toll switch 106 then recognizes the next string as a new destination telephone number, and sets up another call.

Increasingly, common channel signaling is provided for access to and egress from the toll network. For example, customer premise equipment, such as PBX 120, includes a signaling connection 121 to central control 109 of toll switch 106. Additionally, some local networks, such as local network 125 have a signaling connection 126 to toll switch 106 via signaling network and signaling transfer point (not shown), as is known in the art. For connections involving common channel signaling, central control 109 monitors the signaling network 137 for signaling from the calling party, such as PBX 120, to indicate connection of features.

Toll switch 106, which in the preferred embodiment is a 4 ESS ™ switch manufactured by AT&T Technologies and described in The Bell System Technical Journal, Vol. 56, No. 7, pages 1015-1320, September 1977, is program controlled. It includes a central control 109 comprising central processing unit 115 and memory 116. Memory 116 includes a program 117 whose action with respect to the network monitor 113 or 131 are described in connection with FIG. 10. Memory 116 also contains call records 118 for maintaining data associated with calls in the system, and a table 110 of directory numbers (ANIs) of those customers who have subscribed to network features and services. Central control 109 is connected via signaling network 137 to the other toll switches in toll network.

In-band customer-initiated signaling on the network is primarily dual-tone, multi-frequency (DTMF) signals from touch tone telephone station sets such as telephone 101. Network monitors may also monitor for network-initiated signaling, such as ringing, busy, call progress, etc. Therefore, network monitors 107 and 113 comprise a plurality of multi-tone signal processors 131 connected to a control unit 132. Multi-tone signal processors 131 receive data from trunks 135 and determine whether the data received is a recognized signal, such as a DTMF string, a busy signal, or ringing; as is known in the art. If one of multi-tone signal processors 131 determines that a signal has been received, the signal is sent to control unit 132. Control unit 132 collects signals from multi-tone signal processors 131 and performs timing, verification and reporting functions, as will be described below in connection with FIGS. 9 and 10.

In the preferred embodiment, each network monitor will monitor the voice path of either (or both) the calling and the called party for in-band signaling. Each network monitor will be capable of monitoring all 24 DS0s within a DS1, both calling and called parties simultaneously. Multi-tone signal processors 131 may be directed by its control unit 132 to disable signal processing when monitoring is not activated.

Since most toll switches handle several DS1s, there will be many network monitors for each toll switch. In order to control all of the network monitors for any toll switch from one central control, the network monitors are connected to a transaction network, in the preferred embodiment, LAN 139. LAN 139 provides two-way communication between all of the network monitors in the toll switch and controller 140. Controller 140 is connected to processor 115 via bus 130, as is known in the art.

Figure 2:
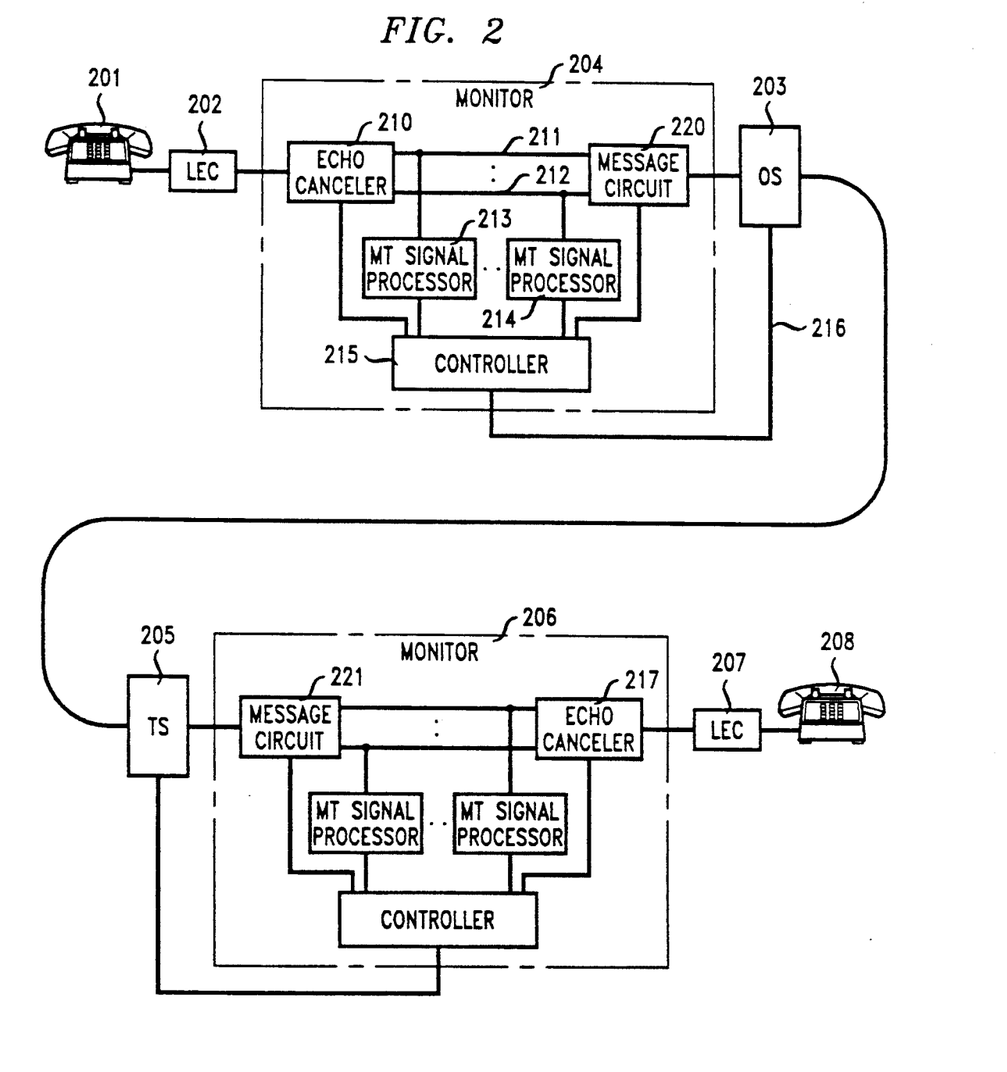
FIG. 2 is an exemplary embodiment of network monitors in the network of FIG. 1.

FIG. 2 illustrates block diagram of a first exemplary embodiment of this invention in the context of a telephone network showing the relationship among the network monitor and the switches. In a first exemplary embodiment, telephone 201 places a call to local exchange carrier 202 which sends the call to originating switch 203. Originating switch 203 determines that this caller subscribes to network services and, as a result, activates network monitor 204 for this call on the incoming trunk, on the access side of originating switch 203. It is advantageous to have a network monitor on the access side of the switch so that the channel may be monitored while the call is being set up and routed to the destination telephone. This provides monitoring in situations when calls cannot be completed to the terminating switch because, for example, a trunk group is busy. In this exemplary embodiment, the call is connected through the network to terminating switch 205. Terminating switch 205 routes the call through network monitor 206 and to local exchange 207. Local exchange 207 routes the call to telephone 208.

Monitor 204 includes, for each channel, an echo canceler 210 on the incoming 211 channel and multi-tone signal processors 213,214 for each of the incoming and outgoing channels. Multi-tone signal processors 213,214 detect DTMF digits, ringing, busy, and other network signals, as is known in the art. Both multi-tone signal processors 213, 214 report to controller 215. Controller 215 communicates with originating toll switch 203 via LAN 216. In each monitor, the echo canceler is on the LEC side of the multi-tone signal processor. This is preferred because a DTMF signal from telephone 201, for example, may send a signal to a monitor 204, but the DTMF signal continues through the network to telephone 208 and reflects back into the network, as is known in the art. Thus multi-tone signal processors 213 and 214 would receive the DTMF signal and its echo and could not, without a fairly complicated algorithm, determine whether the calling or called party originated the signaling. The reflection of signals from telephone 201 would be canceled by echo canceler 217 in monitor 206. Likewise, signaling echos from telephone 208 would be canceled by echo canceler 210. In this manner, multi-tone signal processors 213, 214 in monitor 204 can determine whether signals originated with the calling 201 or called 208 telephone.

Additionally, a message circuit 220 and 221 may be a part of the monitors 204 and 206 to provide prerecorded announcements, synthesized speech, or tones, as is known in the art. Message circuit 220 is under the control of controller 215 and is used to acknowledge a recognized signal sequence, for example. Additionally, message circuit 220 may report invalid signal sequences to the users, or provide other announcements or acknowledgements dependent upon the feature or service.

Figure 3:
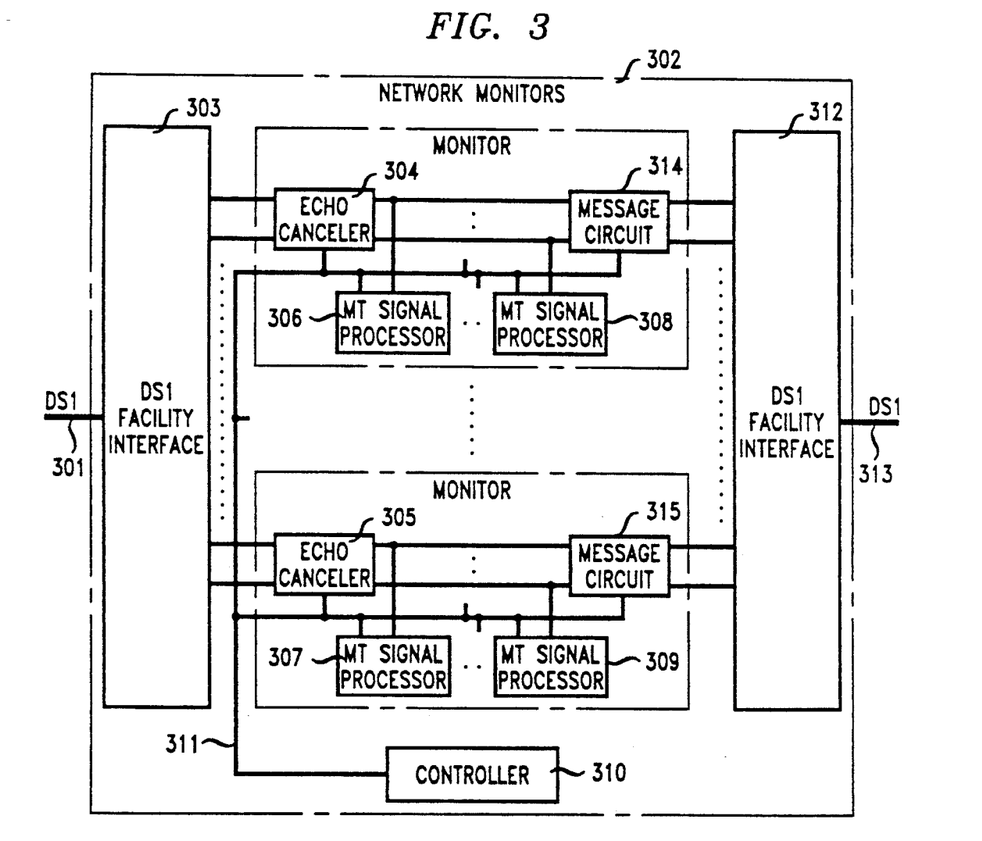
FIG. 3 is a functional block diagram of the network monitor of FIGS. 1 and 2.

Turning now to FIG. 3, a block diagram of an exemplary embodiment of a network monitor of FIGS. 1 and 2 is shown. In this embodiment, DS1 301 is connected to monitor 302 at a first DS1 facility interface 303. DS1 facility interface 303 demultiplexes the 24 DS0s from DS1 301. Each DS0 or channel is then connected to an echo canceler, for example 304, 305. From echo canceler 304, 305, the circuit continues to incoming multi-tone signal processors 306, 307 and outgoing multi-tone signal processors 308, 309, respectively. Multi-tone signal processors 306 through 309 are connected to controller 310 via a bus 311. Controller 310 controls all multi-tone signal processors. All DS0s are remultiplexed at a second DS1 facility interface 312 and connected to DS1 313.

Controller 310 also provides timing and verification functions. After a signal is detected, controller 310 stores the signal and sets a timer. Controller 310 compares the stored signal to a provisioned list of signals to determine if the stored signal is valid. If the signal is valid, controller 310 sends a token or other coded representation of the signal received to central control via the LAN (not shown). If the signal is not valid., and the timer has not expired, controller 310 waits for further signals. If further signals are detected, the process outlined above is repeated. If the timer expires, then the storage buffer is cleared.

Optionally, controller 310 may provide a confirmation tone or tones to the signaling party to indicated the receipt of a valid signal string through message circuit 314, under the control of the central controller. Controller 310 may also provide announcements through message circuit 314 stating that a partially valid signal was received but the timer expired, and/or an announcement of the provision of service.

Figure 4:
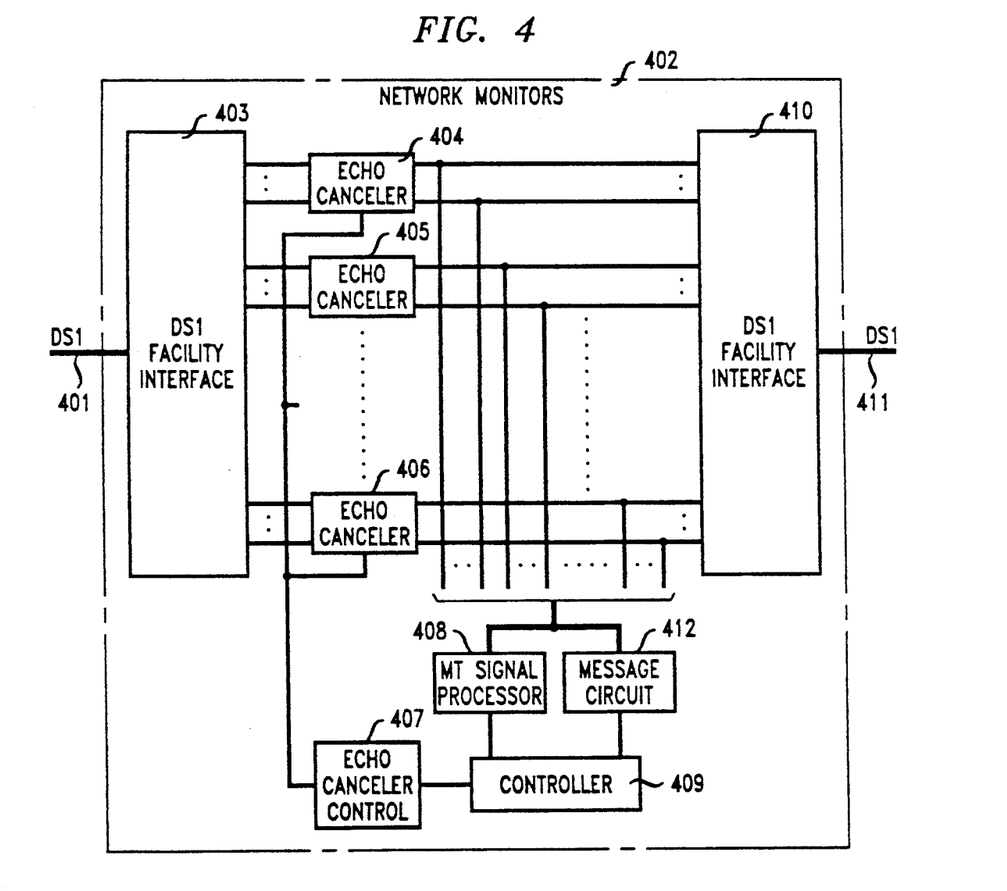
FIG. 4 is an alternative embodiment of the network monitor of FIG. 3.

An alternative exemplary embodiment of a network monitor according to this invention is shown in FIG. 4. DS1 401 is connected to a network monitor at a DS1 facility 403, as above. Each DS0 is connected to an echo canceler 404 through 406. Each echo canceler 404 through 406 is time multiplexed to a master echo canceler controller 407. Each DS0 is then tapped to a common multi-tone signal processor 408, which detect signals through time multiplexing each DS0. Multi-tone signal processor 408 reports detected signaling to controller 409. A common message circuit 412 is connected to each of the DS0, and is under control of the controller 409. Each DS0 is then remultiplexed at second DS1 facility interface 410 to DS1 411.

Figure 5:
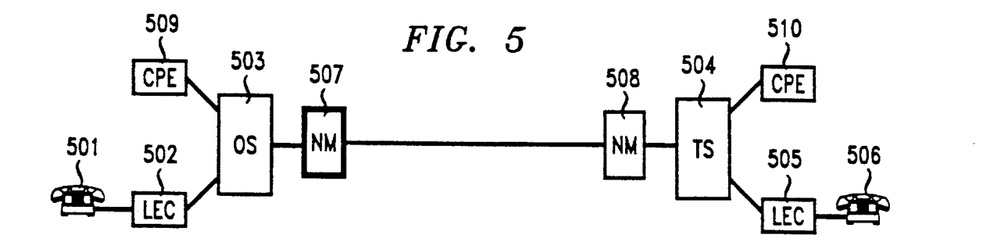
FIGS. 5 through 9 are block diagrams of several network configurations alternate to FIG. 2, showing the relationship between an active network monitor as described in FIG. 1 and the network.

FIGS. 5 through 9 illustrate additional exemplary embodiments, alternate to FIG. 2, showing the relationship of the network monitor to several different network topologies regularly encountered in network telecommunication. FIG. 5 illustrates a general case of a network call and the relationship between the network monitor and the network. A call is placed by a calling party from telephone station set 501 to a local office in the local exchange carrier (LEC) 502. LEC 502 routes the call to an originating toll switch 503. Originating toll switch 503 routes the call, based on traffic and other considerations as known in the art, to a terminating toll switch 504. Terminating toll switch 504 routes the call to a destination LEC 505. LEC 505 routes the call to telephone station set 506 for the called party.

While the originating toll switch 503 is routing the call, it is also determining whether the call is to be monitored for customer signaling. If so, then originating toll switch 503 causes network monitor 507 to be activated on the intertoll side of originating toll switch 503, between originating toll switch 503 and the terminating toll switch 504, in this exemplary embodiment. Network monitor 508 on the intertoll side of terminating toll switch 504 is not activated in this preferred embodiment, but one skilled in the art may envision features wherein monitoring from network monitor 508 may be advantageous. For example, the user of telephone 506 may subscribe to a feature such as multi-way network calling, wherein the user may signal terminating switch 504 to provide a conference circuit. The echo cancelers in network monitor 508 are always active. If common channel signaling is available at egress and access, as it is when CPE 509 calls CPE 510, then originating toll switch 503 monitors the signaling network for an indicator of features.

Monitoring on the intertoll side of originating toll switch 503 is preferred in this embodiment because both directly connected calls and switched-access calls may be monitored from this point. Most of the services and features currently envisioned that will require monitoring the network for signaling require action at originating toll switch 503, and the immediacy of having network monitor 507 active at the originating toll switch 503 provides faster service and fewer signaling communications among switches. Additionally, network monitor 507 is on the network side of originating toll switch 503 so that the echo canceler in network monitor 507 may cancel any signaling echo, as described above.

Figure 6:
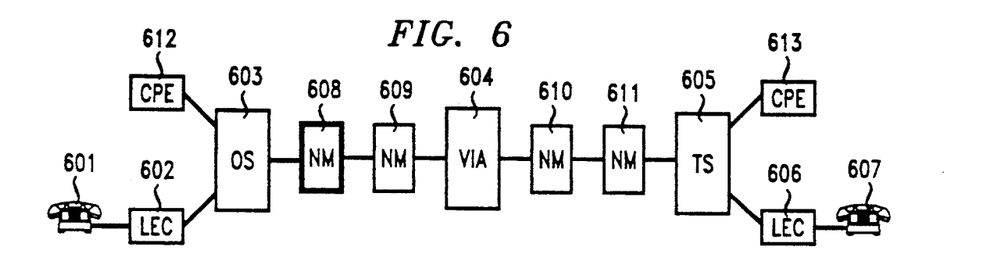

FIG. 6 illustrates a slightly more complex network call topology. In FIG. 6, a call is placed from a calling party at a telephone 601 connected to LEC 602. LEC 602 routes the call to originating toll switch 603, which routes the call to an intermediate toll switch 604 (VIA switch). A VIA switch 604 may be part of the network connection when the call is over a long distance (i.e., transcontinental), or when there is no direct trunk available, as is known in the art. The call is then routed to a terminating toll switch 605, which routes the call to LEC 606. LEC 606 routes the call to the telephone 607 of the called party. In the topology of FIG. 6, network monitors 608-611 are located at each side of the toll switches. In the preferred embodiment, only network monitor 608 on the intertoll side of originating toll switch 603 would be active to provide originating toll switch 603 with information regarding customer signaling. Likewise, originating toll switch 603 monitors signaling connection, such as a connection between CPE 612 and CPE 613.

Figure 7:
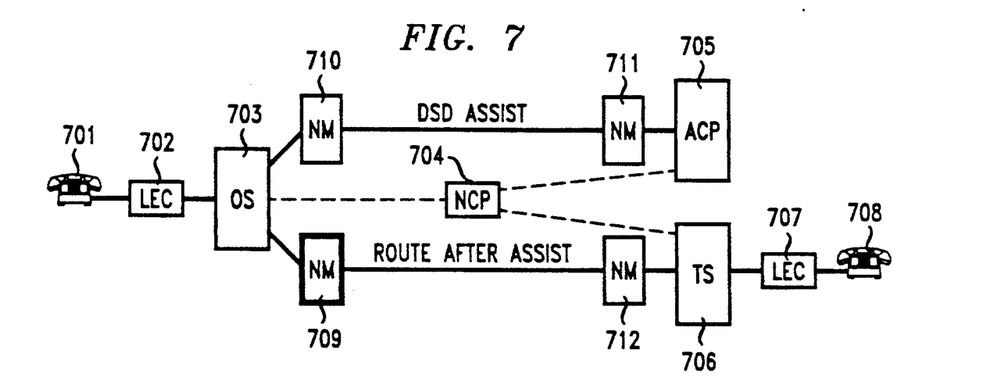

FIG. 7 illustrates a relatively common call topology. A calling party places a call at telephone 701 through LEC 702. LEC 702 routes the call to an originating toll switch 703, as above. In this case, the calling party dialed a typical toll special code, such as "800", "900", or the like, and toll switch, recognizing the code, queries a network control point (NCP) database 704 via the signaling network. In response to the database results, originating toll switch 703 routes the call to an action control point 705 (ACP). In many cases, ACP 705 returns a further destination telephone number to originating toll switch 703, and originating toll switch 703 in response routes the call to a terminating toll switch 706. Terminating toll switch 706 routes the call to LEC 707, and the call is routed to telephone 708 of the called party. In this topology, a network monitor 709 is activated on the network side of the originating toll switch 703 on the channel between the originating 703 and the terminating 706 toll switches. It has been determined that features are unlikely to be employed in the ACP 705 portion of the call, because ACP 705 is likely to prompt and collect DTMF digits for other purposes.

Figure 8:
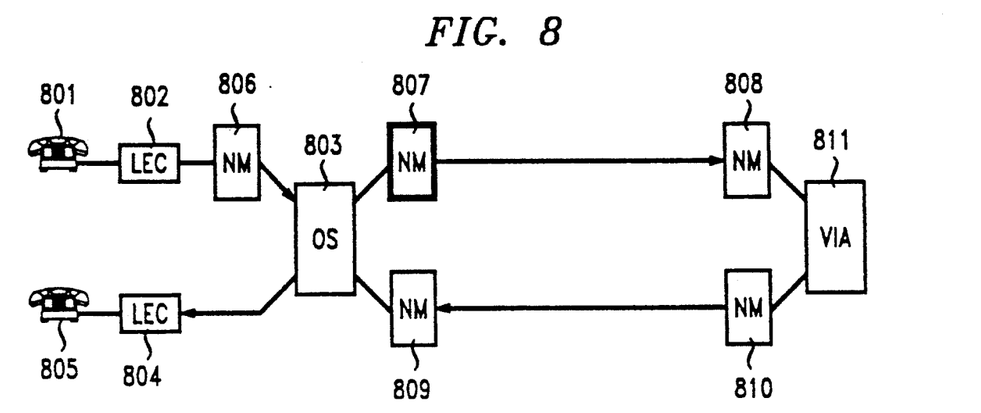

FIG. 8 illustrates a special call topology for a case where an originating call is placed from telephone 801 through LEC 802 to telephone 805 connected to terminating LEC 804, which are both connected to originating toll switch 803. In this case, a network monitor may be activated in one of two locations in the call path. If the trunk from LEC 802 is of the type that may be monitored, the network monitor 806 may be enabled, and the call monitored from the LEC side of origination toll switch 803, as described in FIG. 2 above. If the trunk from LEC 802 is not the type that may be monitored, and the calling party subscribes to network features, then origination toll switch 803 routes the call through a VIA switch 811, and back to origination toll switch 803. This topology permits network monitor 807 to be activated, and network monitor 809 to serve as an echo canceler.

Figure 9:
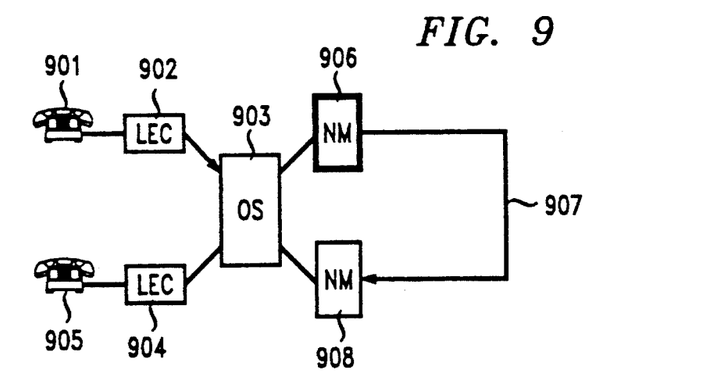

FIG. 9 illustrates an alternative topology to the network topology of FIG. 8. A special loop-around trunk 907 may be employed to provide network monitor 906 connections to calls with a common toll switch. In this manner, routing the call to a VIA switch is avoided, thus using fewer network resources and time while providing the same level of features and services.

Figure 10:
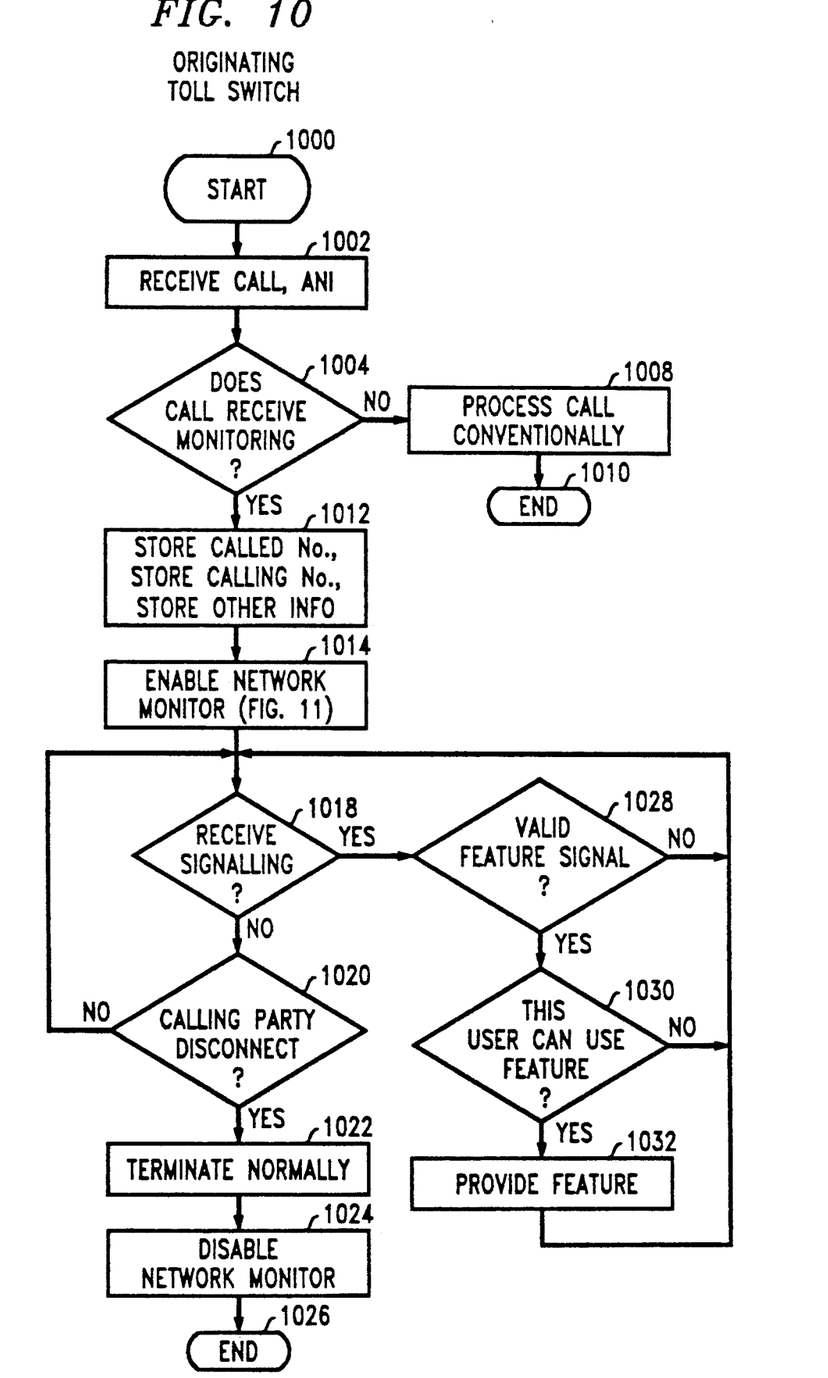
FIG. 10 is a flow diagram of actions performed by the toll switch of FIG. 1 in monitoring the network for in-band and out-of band signaling.

FIG. 10 is a flowchart which describes the action taken at the originating toll switch. Boxes 1000 through 1014 are performed for in-band signaling (monitoring for DTMF and other signaling). The remainder of the flow chart applies to both in-band and out-of-band (common channel) signaling. Processing begins in box 1000 and proceeds to box 1002 where the toll switch receives an incoming call and receives the automatic number identification of the calling party.

Processing continues to decision diamond 1004, where a decision is made whether this calling party subscribes to features which would require a network monitor. This decision may be made, for example, via a table look up in main memory of the central control of the originating toll switch. Alternatively, the central control of the originating toll switch may send an inquiry to a centralized database at, for example, a network control point. If the calling party may not use features, then processing continues to box 1008 where the call is processed conventionally. This branch ends at 1010.

If a calling party does subscribe to network features, then processing continues to box 1012, where the calling number is stored and other information is stored on a per call basis (such as billing data, etc.). Processing proceeds to box 1014 where a network monitor is enabled. The central control sends an activation message to the network monitor, giving a channel identification.

Parallel to this processing, a call is completed to the destination and the network monitor is on and is monitoring the trunk for customer signaling. Processing waits in decision diamond 1018 to determine if signaling has been received. If signaling is not received in decision diamond 1018, then a test is made if the calling (originating) party has disconnected in decision diamond 1020. If, in decision diamond 1020, the calling party did not disconnect, then processing returns to the received signaling decision diamond 1018. If the calling party did disconnect in decision diamond 1020, then processing continues to box 1022 where the call is terminated normally. If a monitor were activated, processing then proceeds to box 1024 where a network monitor turn-off message is sent to the network monitor, and processing ends in box 1026.

If central control receives signaling in decision diamond 1018, either from the signaling channel or the network monitor, then processing returns to decision diamond 1028 where the received signal string is compared to a list of valid strings. If the string is not valid in decision diamond 1028, then processing returns to decision diamond 1018.

If the received string is valid in decision diamond 1028, then processing proceeds to decision diamond 1030, where a determination is made whether this user may use the feature corresponding to the received string. The results of this test may depend on call state or other timing. For example, the signal for sequence dialing may only be valid after calling party termination, whereas voice messaging service may be available at any time. Additionally, if ringing is detected, a timer may be set and, upon expiration of the timer, the network monitor may be activated to monitor for signaling to route the call to a voice mail system, for example. If the user may not use the feature, the processing returns to decision diamond 1018. Optionally, the user may be notified that he or she cannot use the feature, by means of a prerecorded message or other audible or visual (ISDN) signal. If the caller may use the feature, as determined in decision diamond 1030, then processing proceeds to box 1032, where the feature is provided, as is known in the art, or hereafter invented. A confirmation tone or announcement may optionally be given to acknowledge receipt of a valid string. Processing then returns to decision diamond 1018.

Figure 11:
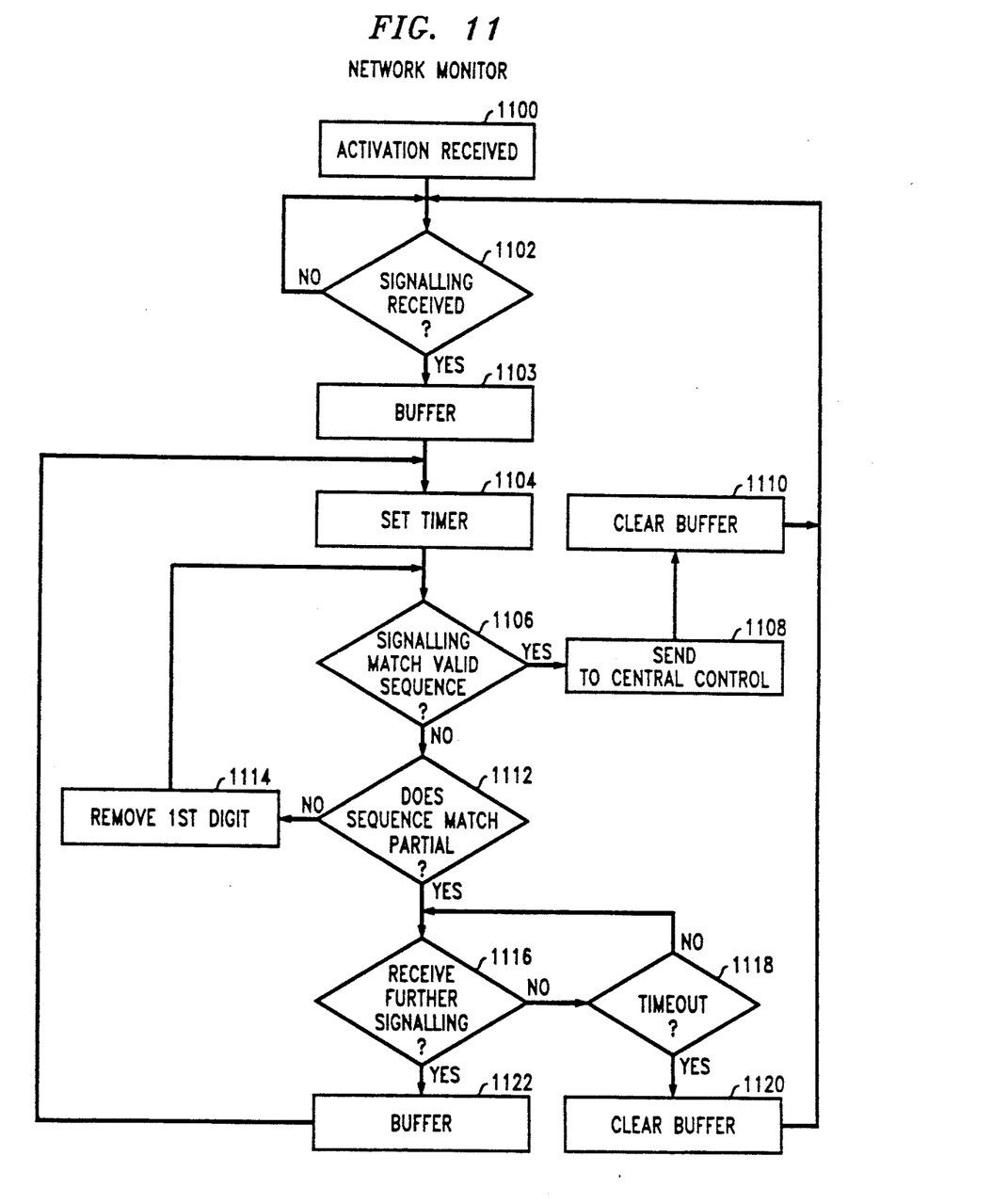
FIG. 11 is a flow diagram of actions performed by the network monitors of FIGS. 1 through 9 for a typical call requiring monitoring for in-band signaling.

Turning now to FIG. 11, a flowchart at the network monitor is shown. Processing begins when an activation message is received from central control of the toll switch in box 1100. In decision diamond 1102 a determination is made if a signal has been detected by the multi-tone signal processor. If a signal has not been detected, then processing waits at decision diamond 1102. If a signal has been detected in decision diamond 1102, the received signal is buffered in box 1103 and processing proceeds to box 1104 where a timer is set.

Processing proceeds to decision diamond 1106 where a test is made if the received DTMF digit or digits in the buffer matches one of a table of signals stored in the control unit. If the received signal does match one of the strings of signals, then processing continues to box 1108 where the signals are sent to the central control of the toll switch via the LAN. The buffer is cleared in box 1110, and processing then returns to decision diamond 1102.

If the signals so far received do not match a valid string in decision diamond 1106, then processing proceeds to decision diamond 1112 where a test is made if the received signaling partially match a partially valid sequence. If the received signaling does not match a partially valid sequence, then it is most likely that a false digit has been collected. Processing proceeds to box 1114 where the first digit is removed. Processing then loops back to decision diamond 1106.

If the received signals match a partially valid sequence in decision diamond 1112, then processing proceeds to decision diamond 1116, where a determination is made whether further signals have been received. If further signals have been received, then the signals are buffered in box 1122 and processing loops back to box 1104. If further signals have not been received in decision diamond 1116, then processing continues to decision diamond 1118 to determine if the timer has expired. If the timer has expired, then processing proceeds to box 1120 where the buffer is cleared, and processing returns to decision diamond 1102.

If in decision diamond 1118 the timer has not expired, processing proceeds to decision diamond 1116 where a test is made if further signaling has been received. This processing continues until the control unit receives a turn off message from the central control of the toll switch. In some systems, a "#" character is used as a string termination character. A check could be made for the "#" character and the string translated to a token and sent to central control in place of decision diamond 1106, or supplemental thereto.

It is to be understood that the above-described embodiments are merely illustrative principles of the invention and that many variations may be devised by those skilled in the art, without departing from the scope of the invention. It is, therefore, intended that such variations be included within the scope of the claims.

We claim:

1. In a telecommunications network comprising a plurality of network switches, a plurality of channels interconnected to said network switches, and a plurality of network monitors each under the control of one of said network switches and connected in pairs to respective opposite ends of one of said channels, each of said network monitors comprising a multi-tone signal processor and an echo canceler, a method for providing access to network services comprising the steps of:

receiving a call origination from an identified calling line on said one channel at a first of said plurality of network switches, said first network switch determining that said identified calling line subscribes to network services, said first network switch enabling said multi-tone signal processor in one of said pair of network monitors to monitor said channel for signaling during a period from a call set-up continuing throughout a connection of said identified calling line and a terminating line, and ending upon a termination of the call by said identified calling line, a second of said pair of network monitors canceling echoes of said signaling;

said one of said pair of network monitors reporting said signaling to said first network switch in response to its detection of signaling; and said first network switch providing access to network services for said one of said channels.

2. A method in accordance with claim 1 wherein said connected network monitors are on an access side of said network switches.

3. A method in accordance with claim 1 wherein said connected network monitors are on an intertoll side of said network switches.

4. A method in accordance with claim 1 further including the step of, before said step of reporting said signaling to said first network switch, said one of said pair of network monitors determining if said signaling comprises a valid signal string.

5. A method in accordance with claim 4 wherein said valid signal string comprises one or more dual-tone, multi-frequency (DTMF) digits.

6. A method in accordance with claim 4 wherein said valid signal string comprises network signaling tones.

7. A method in accordance with claim 1 wherein said call origination comprises an identification of a calling line, and wherein said step of enabling said multi-tone signal processor in one of said pair of network monitors connected to said one of said channels is performed only after said first network switch determines that said identified calling line subscribes to network services.

8. A method in accordance with claim 1 wherein said call origination comprises an identification of a calling line, and wherein said providing access to network services is performed only after said first network switch determines that said identified calling line subscribes to network services.

9. A method in accordance with claim 1 wherein said call origination comprises a destination number, and wherein said providing access to network services is performed only after said first network switch determines that said destination number subscribes to network services.

10. A method in accordance with claim 1 wherein said call origination comprises a destination number, and wherein said step of enabling said multi-tone signal processor in one of said pair of network monitors connected to said one of said channels is performed only after said first network switch determines that said identified calling line subscribes to network services.

11. A method in accordance with claim 1 wherein said signaling comprises a predetermined plurality of dual-tone, multi-frequency (DTMF) digits said method further including the steps of, before said step of reporting said signaling to said first network switch, said one network monitor receiving a first of said plurality of DTMF digits;
said one network monitor timing the receipt of the remaining predetermined plurality of DTMF digits; and
if said remaining predetermined plurality of DTMF digits is received within a prespecified time, said one network monitor reporting said DTMF digits to said first network switch.

12. A method in accordance with claim 11 further comprising
if said remaining predetermined plurality of DTMF digits are not received within said prespecified time, playing an announcement on said channel.

13. A method in accordance with claim 11 further comprising
after reporting said DTMF digits to said first network switch, said one network monitor acknowledging said signaling on said channel.

14. A method in accordance with claim 13 wherein said acknowledgment comprises playing a tone on said channel.

15. A method in accordance with claim 13 wherein said acknowledgment comprises playing an announcement on said channel.

16. A method in accordance with claim 1 wherein said network switches receive signaling on a signaling channel, and wherein said multi-tone signal processor is enabled in response to a predetermined signal received on said signaling channel by said first network switch.

17. In a network switching system comprising one or more network switches, a plurality of channels interconnected under control of said one or more network switches, and a plurality of network monitors under the control of each of said one or more network switches and connected, in pairs to said channels, each of said network monitors comprising a multi-tone signal processor and an echo canceler, a method for providing access to network services comprising the steps of:
receiving a call origination on one of said channels at an originating one of said one or more network switches, said call origination comprising a destination number and an identification of a calling line;
said originating switch enabling said multi-tone signal processor of one of said pair of network monitors connected to said originating channel to monitor said channel for signaling;
another of said pair of network monitors canceling echo of said signaling;
in response to said signaling, said one of said one or more network monitors reporting said signaling to said originating switch; and
said originating switch providing access to network services for said one of said channels in response to verifying that said calling line may have access to network services.

18. A network monitor comprising:
signal detection means connected to a call path at a call origination network switch for detecting signals communicated on said call path through said call origination network switch and through a call destination network switch;
echo cancellation means connected to said call path in conjunction with said signaling detection means for canceling echoes of signaling from said call destination network switch; and
controller means connected to said signaling detector means responsive to said signaling detection means for determining validity of said detected signals and for initiating network services responsive to ones of said signals determined to be valid.

19. A network monitor in accordance with claim 18 wherein said signaling detection means comprises a multi-tone signal processor.

20. A network monitor in accordance with claim 18 wherein said controller means comprises means for collecting signals from said detector means.

21. A network monitor in accordance with claim 20 wherein said controller means further comprises communication means for communicating said collected signals to said call origination network switch.

22. A network monitor in accordance with claim 21 further including
message means for reporting valid and invalid signals on said call path.

23. A network monitor in accordance with claim 20 wherein said controller means further comprises timing means for timing receipt of signals; and
means for clearing said collection means if valid signals are not received within a predetermined time.

24. A network monitor in accordance with claim 20 wherein said controller means further includes
means for deleting a first one of said collected signals if said collected signals are not valid.

25. A network monitor in accordance with claim 18 wherein each network monitor monitors a plurality of call paths.

* * * * *